US007119808B2

(12) United States Patent
Gonzalez et al.

(10) Patent No.: US 7,119,808 B2
(45) Date of Patent: Oct. 10, 2006

(54) MULTIPLE PARALLEL PROCESSOR COMPUTER GRAPHICS SYSTEM

(75) Inventors: Nelson Gonzalez, Miami, FL (US); Humberto Organvidez, Miami, FL (US); Ernesto Cabello, Hialeah, FL (US); Juan H. Organvidez, Miami, FL (US)

(73) Assignee: Alienware Labs Corp., Miami, FL (US)

( * ) Notice: Subject to any disclaimer, the term of this patent is extended or adjusted under 35 U.S.C. 154(b) by 61 days.

(21) Appl. No.: 10/620,150

(22) Filed: Jul. 15, 2003

(65) Prior Publication Data

US 2005/0012749 A1   Jan. 20, 2005

(51) Int. Cl.
*G06F 15/16* (2006.01)
(52) U.S. Cl. ....................... 345/502; 345/503
(58) Field of Classification Search ............... 345/501, 345/502, 503, 504, 505, 506
See application file for complete search history.

(56) References Cited

U.S. PATENT DOCUMENTS

| | | | |
|---|---|---|---|
| 5,473,750 A | 12/1995 | Hattori | |
| 5,485,559 A | 1/1996 | Sakaibara et al. | |
| 5,560,034 A | 9/1996 | Goldstein | |
| 5,638,531 A | 6/1997 | Crump et al. | |
| 5,774,133 A | 6/1998 | Neave et al. | |
| 5,784,075 A * | 7/1998 | Krech, Jr. | 345/553 |
| 5,790,842 A | 8/1998 | Charles et al. | |
| 5,818,469 A | 10/1998 | Lawless et al. | |
| 5,841,444 A | 11/1998 | Mun et al. | |
| 5,923,339 A | 7/1999 | Date et al. | |
| 5,986,697 A | 11/1999 | Cahill, III | |
| 6,008,821 A | 12/1999 | Bright et al. | |
| 6,088,043 A | 7/2000 | Kelleher et al. | 345/502 |
| 6,157,393 A | 12/2000 | Potter et al. | |
| 6,329,996 B1 | 12/2001 | Bowen et al. | |
| 6,384,833 B1 | 5/2002 | Denneau et al. | |
| 6,473,086 B1 | 10/2002 | Morein et al. | |
| 6,529,198 B1 | 3/2003 | Miyauchi | |
| 2002/0130870 A1* | 9/2002 | Ebihara | 345/440 |
| 2003/0112248 A1* | 6/2003 | Pronkine | 345/545 |
| 2003/0227460 A1* | 12/2003 | Schinnerer | 345/539 |
| 2004/0085322 A1* | 5/2004 | Alcorn et al. | 345/562 |
| 2004/0223003 A1* | 11/2004 | Heirich et al. | 345/629 |

FOREIGN PATENT DOCUMENTS

| | | |
|---|---|---|
| EP | 1 061 434 A2 | 12/2000 |
| EP | 1 061 434 A3 | 2/2002 |

OTHER PUBLICATIONS

Kevin T. Lefebvre et al., "An API for Interfacing Interactive 3D Applications to High-Speed Graphics Hardware," May 1998, The Hewlett-Packard Journal, pp. 6-8.
International Search Report dated Dec. 1, 2004.

* cited by examiner

*Primary Examiner*—Matthew Luu
(74) *Attorney, Agent, or Firm*—Hogan & Hartson LLP

(57) ABSTRACT

An accelerated graphics processing subsystem that significantly increases the processing speed of computer graphics commands. The preferred embodiment of this invention presents a first-of-its-kind graphics processing subsystem that combines the processing power of multiple, off-the-shelf, video cards, each one having one or more graphic processor units. The video cards can be used without substantial modification. Under the preferred embodiment, each video card processes instructions for drawing a predetermined portion of the screen which is displayed to the user through a monitor or other visual output device. The invention harnesses the power of multiple video cards without suffering from the high bandwidth constraints affecting prior attempts at parallel graphics processing subsystems.

6 Claims, 4 Drawing Sheets

MULTIPLE PARALLEL PROCESSOR COMPUTER GRAPHICS SYSTEM

TECHNICAL FIELD

The present invention relates to the processing of graphics instructions in computers. Specifically, the preferred embodiment of the present invention discloses an accelerated graphics processing subsystem for use in computers that utilizes multiple, off-the-shelf, video cards, each one having its own or multiple graphic processor units ("GPUs"), and assigns each video card to generate instructions for drawing a predetermined portion of the screen which is displayed to the user through a monitor or other visual output device. The video cards to be used in the disclosed invention need not be modified in any substantial way.

BACKGROUND OF THE INVENTION

Even before the beginning of the widespread use of personal computers, computer graphics has been one of the most promising, and most challenging, aspects of computing. The first graphics personal computers developed for mass markets relied on the main computer processing unit ("CPU") to control every aspect of graphics output. Graphics boards, or video cards, in early systems acted as simple interfaces between the CPU and the display device, and did not conduct any processing of their own. In other words, these early video cards simply translated low level hardware commands issued by the CPU into analog signals which the display devices transformed into on-screen images. Because all of the processing was conducted by the CPU, graphics-intensive applications had a tendency to over-utilize processing cycles and prevent the CPU from performing other duties. This led to overall sluggishness and degraded system performance.

To offload the graphics workload from the CPU, hardware developers introduced video cards equipped with GPUs. GPUs are capable of accepting high level graphics commands and processing them internally into the video signals required by display devices. By way of an extremely simplistic example, if an application requires a triangle to be drawn on the screen, rather than requiring the CPU to instruct the video card where to draw individual pixels on the screen (i.e., low level hardware commands), the application could simply send a "draw triangle" command to the video card, along with certain parameters (such the location of the triangle's vertices), and the GPU could process such high level commands into a video signal. In this fashion, graphics processing previously performed by the CPU is now performed by the GPU. This innovation allows the CPU to handle non-graphics related duties more efficiently.

The primary drawback with early GPU-based video cards was that there was no set standard for the "language" of the various high level commands that the GPUs could interpret and then process. As a result, every application that sought to utilize the high level functions of a GPU-based video card required a specialized piece of software, commonly referred to as a "driver", which could understand the GPU's "language." With hundreds of different GPU-based video cards on the market, application developers became bogged down in writing these specialized drivers. In fact, it was not uncommon for a particularly popular software program to include hundreds, if not thousands, of video card drivers with its executable code. This, of course, greatly slowed the development and adoption of new software.

This "language" problem was resolved by the adoption, in modern computer operating systems, of standard methods of video card interfacing. Modem operating systems, such as the Windows® operating system (sold by Microsoft Corporation of Redmond, Wash.), require only a single hardware driver to be written for a video card. Interaction between the various software applications, the CPU and the video card is mediated by an intermediate software "layer" termed an Application Programming Interface ("API" or "API module"). All that is required is that the video drivers and the applications be able to interpret a common graphics API. The two most common graphics APIs in use in today's personal computers are DirectX®, distributed by Microsoft Corporation of Redmond, Wash., and OpenGL®, distributed by a consortium of computer hardware and software interests.

Since the advent of the GPU-based graphics processing subsystem, most efforts to increase the throughput of personal computer graphics subsystems (i.e., make the subsystem process information faster) have been geared, quite naturally, toward producing more powerful and complex GPUs, and optimizing and increasing the capabilities of their corresponding APIs.

Another way in which hardware developers have sought to increase the graphics subsystem throughput is by using multiple GPUs on a single video card to simultaneously process graphics information. An example of this technology is described in U.S. Pat. No. 6,473,086 to Morein et al. (the '086 patent). In the '086 patent, video command signals from APIs such as DirectX or OpenGL are processed by multiple GPUs, typically two, which are housed on a single video card. One GPU is designated as a "primary" GPU and the other as a "secondary" GPU. Although both GPUs independently process graphics commands that derive from an API, the secondary GPU must still route the information it processes (i.e., the digital representation for the portion of the screen assigned to it) through the primary GPU which, in turn, transfers a single, combined output video signal to the video display device. One obvious and significant drawback with this system, which is also prevalent in the single-video card systems discussed below, is that a high bandwidth pipeline must exist between the two GPUs.

Other attempts at multi-GPU computer graphics subsystems are described in U.S. Pat. No. 5,485,559 to Sakaibara, et al. (the '559 patent); U.S. Pat. No. 5,638,531 to Crump et al. (the '531 patent); U.S. Pat. No. 5,818,469 to Lawless et al. (the '469 patent); U.S. Pat. No. 5,841,444 to Mun et al. (the '444 patent); U.S. Pat. No. 6,008,821 to Bright et al. (the '821 patent); U.S. Pat. No. 6,157,393 to Potter et al. (the '393 patent); U.S. Pat. No. 6,384,833 to Benneau et al. (the '833 patent); and U.S. Pat. No. 6,529,198 to Miyauchi (the '198 patent).

The '559 patent describes a parallel graphics processor with graphics command distributor and command sequencing method, wherein a main processor sends to a command distribution device a series of graphic commands including an attribute command updating the state of the attribute which designates a display mode, and a primitive command defining graphics to be displayed. The command distribution device sequentially distributes the series of graphic commands to a plurality of geometry processors which process the graphics according to the type of command. The primitive command is sent to any one of plurality of geometry processors. At least those of the attribute commands which relate to the attributes of display used by the geometry processors are sent to all the geometry processors. The pixel commands comprising the outputs of those geometry processors are sent to a pixel processor which generates an image corresponding to the pixel commands. The pixel processor arranges pixel commands from the plurality of geometry processors on the basis of the data on the allocation of commands received from the command distribute means and then displays the graphic in the form of geometry data.

The '531 patent describes a multiprocessor integrated circuit with video refresh logic employing instruction/data caching and associated timing synchronization, wherein a digital data handling system handling display signal streams has a video processor which is capable of high performance due to vector processing and special addressing modes. The video processor is a single VLSI device having a plurality of processors, each of which has associated instruction and data caches, which are joined together by a wide data bus formed on the same substrate as the processors. Any graphics subsystem must be able to support a variety of video formats, causing video refresh logic to become complicated. Such potential complications are avoided by the provision of a simple, general purpose hardware refresh system based on the direct color graphics frame buffer, with the broader range of services being provided by emulation using one of the processors included in the device.

The '469 patent describes a method and implementing multiprocessor computer system in which graphics applications are executed in conjunction with a graphics interface to graphics hardware. A master thread, or master node in a distributed network system, receives commands from a graphics application and assembles the commands into workgroups with an associated workgroup control block and a synchronization tag. For each workgroup, the master thread flags changes in the associated workgroup control block. At the end of each workgroup, the master thread copies the changed attributes into the associated workgroup control block. The workgroup control blocks are scanned by the rendering threads, or rendering node in a distributed network system, and unprocessed workgroups are locked, and the rendering threads attribute state is updated from the previous workgroup control blocks. Once the rendering thread has updated its attributes, it has the necessary state to independently process the workgroup, thus allowing parallel execution. A synchronizer thread reorders the graphics datastream, created by the rendering threads, using the synchronization tags and sequentially sends the resultant data to the graphics hardware.

The '444 patent describes a multiprocessor graphics system having a pixel link architecture, includes: (1) a plurality of sub-graphics systems each of which assigned to each of a plurality of sub-screens provided by sectioning a display screen; and (2) a ring network for connecting the plurality of sub-graphics systems. Each of the sub-graphics systems includes a geometry engine, a raster engine, a local frame buffer and a pixel distributor. An interconnection network bottleneck between the raster engine and frame buffer is removed and a conventional memory system can be used by reducing the number of data transmissions between the raster engine and frame buffer while maintaining image parallelism and object parallelism.

The '821 patent describes a multiple embedded memory frame buffer system including a master graphics subsystem and a plurality of slave graphics subsystems. Each subsystem includes a frame buffer and a color palette for decompressing data in the frame buffer. The master subsystem further includes a digital to analog converter coupled to receive the decompressed digital data from the palette of each subsystem and outputting analog versions of the digital data to an output device. The system further includes a timing system for determining which outputs of the subsystems are to be converted by the digital to analog converter at a given time. A method of synchronization of embedded frame buffers for data transfer through a single output includes the steps of generating a first clock signal and a second clock signal in a master embedded frame buffer, sending the first and second clock signals to a slave embedded frame buffer and delaying the second clock signal to be in phase with a third clock signal generated by a graphics controller such that no data is lost when transferring data from the master and slave embedded frame buffers.

The '393 patent describes an apparatus for and method of directing graphical data toward a display device from a plurality of graphics processors by coupling the graphics processors in a manner that reduces the size of the interface on each graphics processor. In particular, each graphics processor produces graphical data for an associated set of pixels on the display device, where each pixel is represented by a first amount of graphical data. The graphics processors are arranged so that one of the graphics processors is a destination processor. The total number of graphics processors that are not designated as the destination processor thus constitute a remaining number. Each graphics processor produces a second amount of graphical data during each clock cycle of a common clock. The first amount of graphical data, however, is comprised of at least substantially two times the second amount of graphical data. The graphics processors then are coupled so that during each clock cycle, the destination processor receives no more graphical data from the other processors than an amount equal to the product of the remaining number and the second amount.

The '833 patent describes a method and parallelizing geometric processing in a graphics rendering pipeline, wherein the geometric processing of an ordered sequence of graphics commands is distributed over a set of processors by the following steps. The sequence of graphics commands is partitioned into an ordered set of N subsequences $S_0 \ldots S_{N-1}$ and an ordered set of N state vectors $V_0 \ldots V_{N-1}$ is associated with said ordered set of subsequences $S_0 \ldots S_{N-1}$. A first phase of processing is performed on the set of processors whereby, for each given subsequence $S_j$ in the set of subsequences $S_0 \ldots S_{N-2}$ state vector $V_{j+1}$ is updated to represent state as if the graphics commands in subsequence $S_j$ had been executed in sequential order. A second phase of the processing is performed whereby the components of each given state vector $V_k$ in the set of state vectors $V_1 \ldots V_{N-1}$ generated in the first phase is merged with corresponding components in the preceding state vectors $V_0 \ldots V_{k-1}$ such that the state vector $V_k$ represents state as if the graphics commands in subsequences $S_0 \ldots S_{k-1}$ had been executed in sequential order. Finally, a third phase of processing is performed on the set of processors whereby, for each subsequence $S_m$ in the set of subsequences $S_1 \ldots S_{N-1}$ geometry operations for subsequence $S_m$ are performed using the state vector $V_m$ generated in the second phase. In addition, in the third phase, geometry operations for subsequence $S_0$ are performed using the state vector $V_0$.

The '198 patent describes a parallel rendering device, wherein a rendering command/data generator distributes rendering commands and data to each of rendering devices with rendering commands and data for one screen as a unit. Each of rendering devices carries out generating of display data and storing of the display data in a rendering memory incorporated in each rendering device in accordance with the rendering commands and data. The content of the rendering memories is read out by a read signal that: is supplied from display control unit and synchronized with the scan of display. A window number buffer issues the window number of the window in which a pixel currently to be displayed is included. A window number/rendering device management table issues the device number of the rendering device as a selection signal. A display switch selects the rendering device of the device number indicated by the selection signal to connect the rendering device to the display. In this way, the most recent display data of the window of the above-described window number is supplied to the display.

Yet other attempts at multi-GPU computer graphics subsystems and/or related inventions are described in U.S. Pat. No. 5,473,750 to Hattori; U.S. Pat. No. 5,560,034 to Goldstein; U.S. Pat. No. 5,774,133 to Neave et al.; U.S. Pat. No. 5,790,842 to Charles et al.; U.S. Pat. No. 5,923,339 to Date et al.; U.S. Pat. No. 5,986,697 to Cahill, III; and U.S. Pat. No. 6,329,996 to Bowen et al.

None of the devices, systems or methods mentioned above describes a graphics processing subsystem for use in a computer that combines the processing power of multiple, off-the-shelf video cards, each one having one or more GPUs, and assigns each video card to process instructions for drawing a predetermined portion of the screen which is displayed to the user through a monitor or other visual output device. In addition, none of the above devices describes a graphics processing subsystem capable of combining multiple, off-the-shelf video cards without substantial modification to the video cards.

Therefore, there is a need in the prior art for a graphics processing subsystem for use in a computer that combines the processing power of multiple video cards, each one having one or more GPUs, and assigns each video card to process instructions for drawing a predetermined portion of the screen which is displayed to the user through a monitor or other visual output device.

There is a further need in the prior art for a graphics processing subsystem capable of combining multiple, off-the-shelf video cards without substantial modification to the video cards.

There is a further need in the prior art for a graphics processing subsystem that can combine the processing power of multiple video cards and which does not require a high bandwidth connection between the video cards.

SUMMARY OF THE INVENTION

The subject invention resolves the above described needs and problems by providing a graphics processing subsystem for use in a computer that combines the processing power of multiple, off-the-shelf video cards without substantial modification, with each video card having one or more GPUs, and assigns each video card to process instructions for drawing a predetermined portion of the screen which is displayed to the user through a monitor or other visual output device such as a cathode ray tube display, a liquid crystal display, a plasma screen display, a projection display, an OLED display, a head-mounted displays, or a hybrid thereof.

The basic components of the present invention are: (1) a software Graphics Command Replicator ("GCR") module; (2) multiple video cards each equipped with at least one GPU; (3) a mechanism to ensure that the video signal outputs of the multiple video cards are synchronized; and (4) a Video Merger Hub ("VMH") hardware/software component.

In general terms, the present invention operates by intercepting the graphics commands issued by a computer application and replicating those commands through the GCR module into multiple graphic command streams. The number of command streams corresponds to the number of video cards present in the system. Each graphic command stream generated by the GCR module directs each video card to generate an image only for a particular portion of the screen. The multiple video cards are synchronized to the same video frame through one of a number of available mechanisms well known to those skilled in the art. The resulting video signals from the multiple video cards are then collected at the VMH and assembled into a complete screen which is then displayed by a monitor or other video output device.

It will be observed by those skilled in the art and through experimentation that by utilizing multiple video cards, each processing only a portion of the screen, that the total throughput of the graphics subsystem is increased in proportion to the number of video cards. The throughput increase, however, is not infinitely extendible as the GCR module introduces at least minimal amounts of processing overhead which also increases in proportion to the number of video cards.

Accordingly, in its preferred embodiment, the present invention consists of an accelerated graphics processing subsystem comprising a graphics command replicator consisting of a software module that intercepts graphics commands issued by an application and generates multiple, modified graphics command streams; a plurality of video cards, each equipped with one or more GPUs, wherein the number of the multiple, modified graphics command streams is equal to the number of the plurality of video cards; a mechanism to synchronize the signal output by the plurality of video cards; and a video merger hub comprised of a video switch, a video switch controller, a microcontroller and a video output; wherein the graphics command replicator generates the multiple, modified graphics command streams such that each of the multiple, modified graphics command streams contains commands to draw only a portion of a graphics screen; each of the multiple, modified graphics command streams is received by a separate video card selected from the plurality of video cards; output signals from the plurality of video cards are received by the video switch and selected portions thereof are sequentially routed to the video output and displayed on a visual output device; and the video switch is controlled by the video switch controller through the triggering of routing switches at appropriate intervals determined by the vertical refresh rate and vertical resolution of the output signals from the plurality of video cards and by the load balancing ratio assigned to each card in the plurality of video cards.

Also disclosed is a method for accelerating the processing of graphics instructions on a computer through the use of a plurality of video cards, comprising the steps of: intercepting graphics commands issued by an application and generating multiple, modified graphics command streams wherein the number of the multiple, modified graphics command streams is equal to the number of the plurality of video cards; synchronizing the signal output by the plurality of video cards; combining the output signal from the plurality of video cards into a single graphics output signal through use of a video merger hub comprised of a video switch, a video switch controller, a microcontroller and a video output; and displaying the single graphics output signal on a visual output device; wherein each of the multiple, modified graphics command streams contains commands to draw only a portion of a graphics screen; each of the multiple, modified graphics command streams is received by a separate video card selected from the plurality of video cards; output signals from the plurality of video cards are received by the video switch and selected portions thereof are sequentially routed to the video output and displayed on a visual output device; and the video switch is controlled by the video switch controller through the triggering of routing switches at appropriate intervals determined by the vertical refresh rate and vertical resolution of the output signals from the plurality of video cards and by the load balancing ratio assigned to each card in the plurality of video cards.

Therefore, it is an object of the present invention to provide an accelerated graphics processing subsystem for use in computers that combines the processing power of multiple video cards, each one having one or more GPUs, and assigns each video card to process instructions for drawing a predetermined portion of the screen which is displayed to the user through a monitor or other visual output device. It is an additional object of the present invention to provide a graphics processing subsystem capable of accelerating video graphics output by combining multiple, off-the-shelf video cards without substantial modification. It is yet another object of present invention to provide a graphics processing subsystem which does not require a high bandwidth connection between the video cards.

These and other objects, features and advantages of the present invention may be more clearly understood and appreciated from a review of ensuing detailed description of the preferred and alternate embodiments and by reference to the accompanying drawings and claims.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
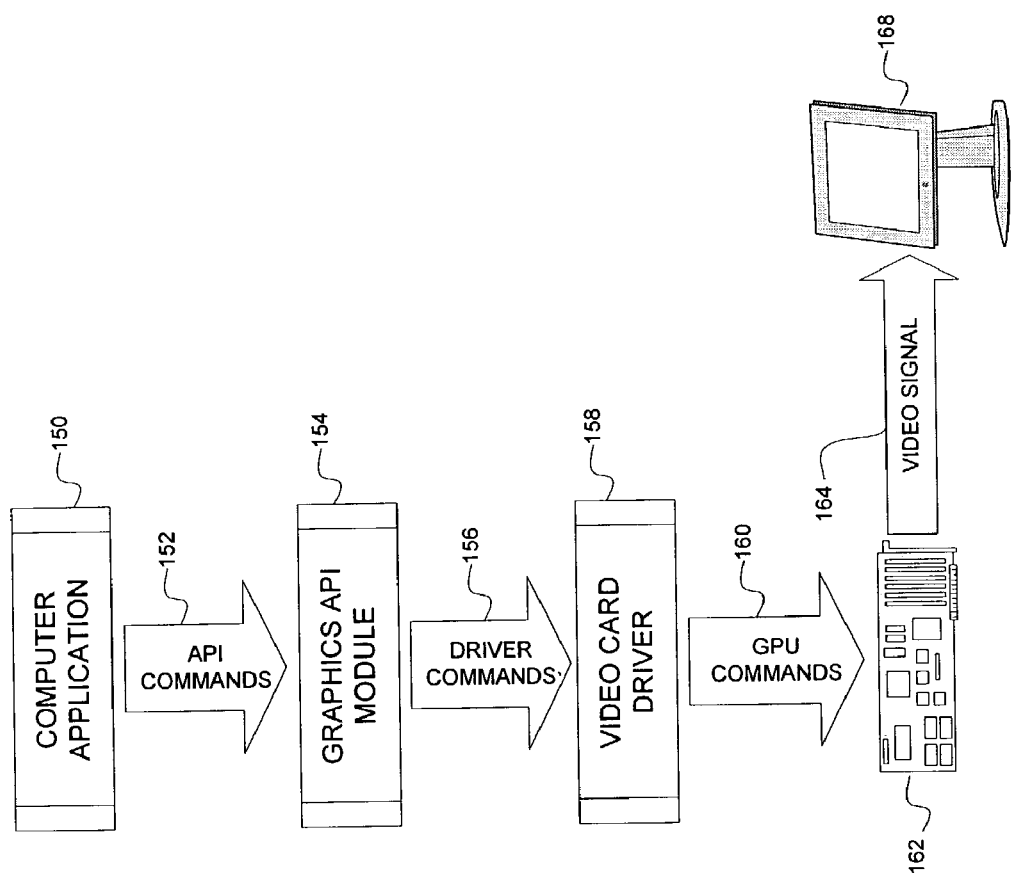
FIG. 1 shows a block diagram of a typical (prior art), single video card graphics subsystem.

FIG. 1 is a block diagram illustrating a modern-day graphics subsystem within a computer typically configured without the present invention, and its interaction with typical personal computer software to generate an image.

Under typical circumstances, a computer application 150, such as a game, 3D graphics application or other program, will generate API commands 152 for the various graphics that it requires to be displayed on the display device 168. The API commands 152 will be issued so that they may be interpreted in accordance with one of several available APIs installed on the computer, such as DirectX or OpenGL. The appropriate API module 154 receives the API commands 152 issued by the application and will, in turn, process and transmit driver commands 156 to a video card driver 158. The video card driver 158 in turn issues GPU commands 160 to a video card 162. The video card 162 will then receive the GPU commands 160 and will, through its internal circuitry, translate the commands into a video signal 164 which is received by the display device 168 and is displayed to the user.

Figure 2:
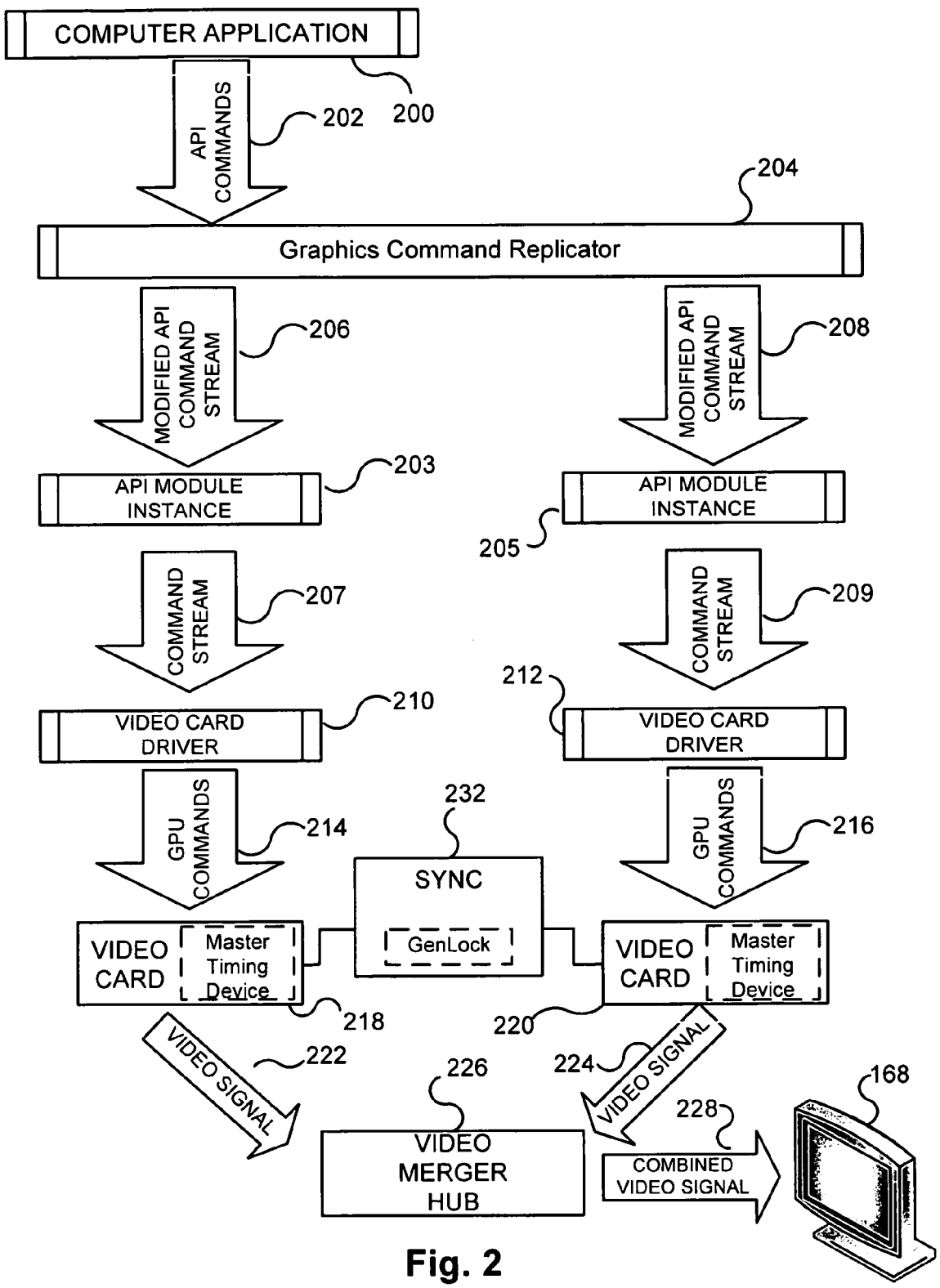
FIG. 2 shows a block diagram of the multi-video card graphics subsystem of the present invention.

FIG. 2 is a block diagram illustrating a graphics subsystem configured in accordance with the present invention and its interaction with typical personal computer software to generate an image. For illustrative purposes only, FIG. 2 illustrates a system equipped with two video cards, each having a single GPU. However, it will be understood by those skilled in the art that additional video cards may be added to the system thereby increasing its effectiveness. Additional effectiveness may be achieved by incorporating multiple video cards, each having more than one GPU and/or by including a mix of video cards, some having single GPUs and some having multiple GPUs.

Under the present invention, the GCR module 204 is a software program that resides between the computer application and multiple instances of the API module 203,205. The GCR identifies and intercepts API commands 202 issued by the application 200 before those commands reach the API module instances 203,205. Once intercepted, the GCR module 204 generates multiple, modified API command streams 206,208. The modified API command streams 206, 208 are received by the API module instances 203,205 which in turn each generate a command stream 207,209 that is received and processed by its assigned video card driver 210,212. The number of modified API command streams 206,208, and of instances of the API module 203,205, in this case two (2), is equal to the number of video cards being employed in the system. The API streams are generated in such a way that each video card will generate only the pixels that are contained within a particular region of the screen assigned to that video card.

Figure 3:
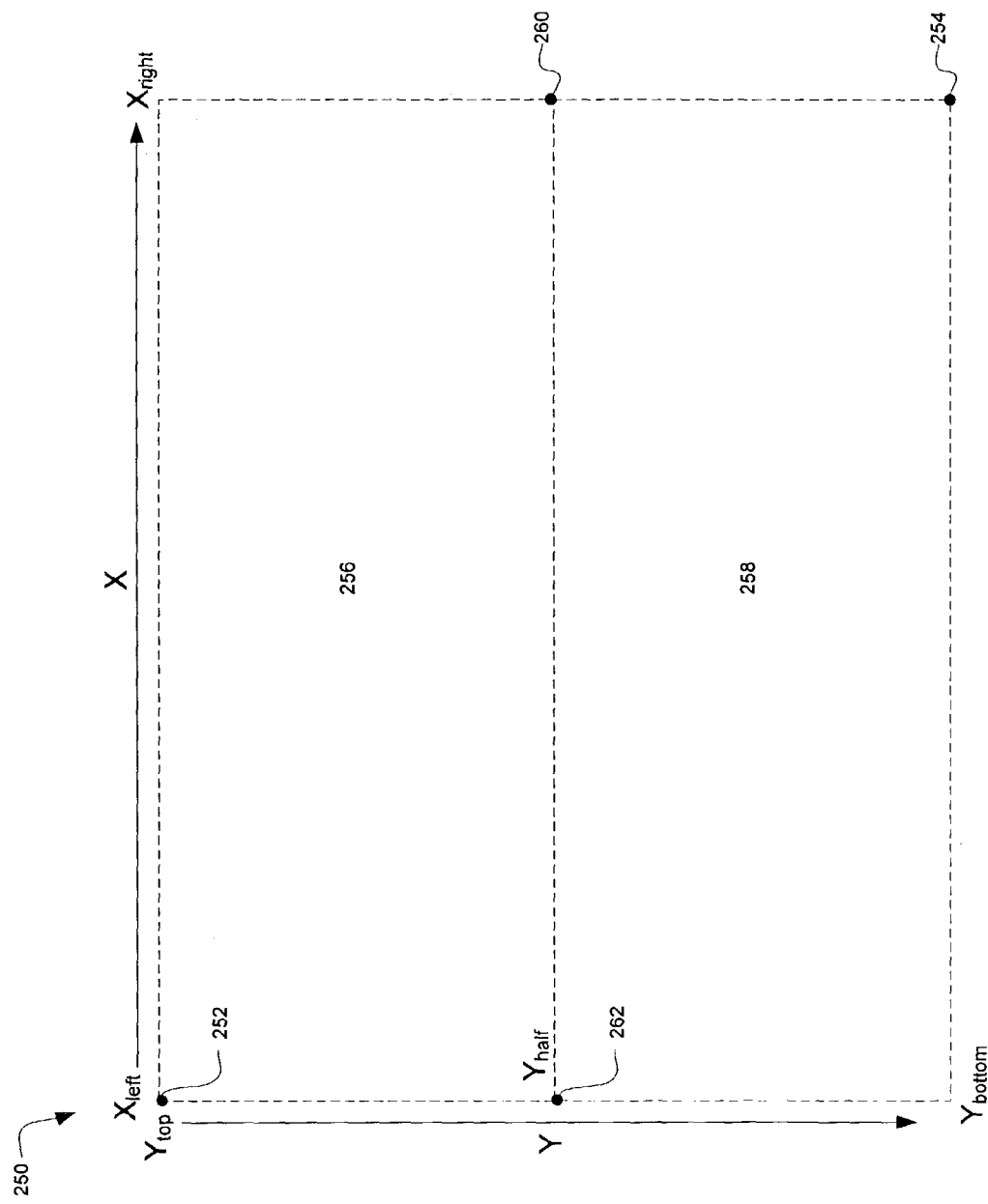
FIG. 3 shows an illustration of the application of the multiple command streams generated by the Graphics Command Replicator of the present invention.

To better understand this "multiple command stream" concept, FIG. 3 illustrates how it is applied to the present invention. As shown in FIG. 3, a complete graphics screen 250 is composed of a plurality of pixels. The pixels are arranged in an X-Y grid and each pixel in the screen can be addressed using its unique X,Y coordinate. The range of coordinates for the entire screen extends from $X_{left}$, $Y_{top}$ for the upper left corner 252 to $X_{right}$, $Y_{bottom}$ for the lower right corner 254 of the display. If, by way of the most simple example, the present invention were applied using two video cards, the screen could be divided into an upper half 256 and a lower half 258. The pixel coordinates for the upper half of the screen would range from $X_{left}$, $Y_{top}$ (252) to $X_{right}$, $Y_{half}$ (260), and the pixel coordinates for the lower half of the screen would range from $X_{left}$, $Y_{half}$ (262) to $X_{right}$, $Y_{bottom}$ (254).

Accordingly, and returning to FIG. 2, the command stream 207 corresponding to the video card 218 assigned to draw the upper part of the screen could instruct the video card to process and draw only those pixels which are within the rectangle bound by coordinates $X_{left}$, $Y_{top}$ (252) and $X_{right}$, $Y_{half}$ (260). Similarly, the command stream 209 corresponding to the video card 220 assigned to draw the lower part of the screen would instruct the video card to process and draw only those pixels which are within the rectangle bound by coordinates $X_{right}$, $Y_{half}$ (262) and $X_{right}$, $Y_{bottom}$ (254).

The "multiple command stream" modification can be accomplished through a variety of techniques well known in the art, a detailed discussion of which is beyond the scope of this patent. By way of example, one way used to generate the multiple command streams is to insert into each stream a unique "2D Clipping" or "3D Clipping" command which instructs the video card assigned to the stream to "draw" only those pixels which are contained within a particular rectangular contiguous region of the screen assigned to that card. For example, in a two card system where a first card is assigned the top part of the screen and a second card the bottom part, the stream corresponding to the first card would receive the video stream for the entire screen, but would also receive a 2D or 3D clipping command instructing it to "clip"(i.e., not draw) any pixels which are not within the top part of the screen. Conversely, the second card would also receive the video stream for the entire screen, but would receive a 2D or 3D clipping command instructing it to "clip" any pixels which are not within the bottom part of the screen.

The GCR can also dynamically modify the various command streams so that each video card receives video commands pertaining only to a particular portion of the screen. In simple terms, each video card does not receive the entire command stream necessary to paint the entire image. For example, in a two video card system with each card being responsible for fifty percent of the screen (i.e., top/bottom), the GCR would receive, interpret and process the API commands from the computer application and issue two sets of commands. The "top portion" video card would receive the commands required to draw only those pixels relevant to the top portion of the video screen. The "bottom portion" video card would receive the commands required to draw only those pixels relevant to the bottom portion of the video screen.

It will be understood by those skilled in the art that the different portions of the screen assigned to each video card need not be equal in size, nor must each card be assigned a contiguous portion of the video screen. Under most, but not all circumstances, it will be desirable to ensure that every portion of the screen be accounted for and assigned to a video card. However, situations can easily be envisioned where regions of the screen remain graphically static throughout and thus the graphics throughput would be increased if such regions were drawn once and then left unassigned.

Continuing with FIG. 2, each of the command streams 207,209 is then processed by its assigned video card driver 210,212 which in turn issues GPU commands 214,216 to a respective video card 218,220. Each video card 218,220 in turn generates a video signal 222,224 corresponding to its respective portion of the screen.

The multiple video cards are synchronized 232 to ensure that all of the video cards in the system are generating video data for the same pixel at the same time. There are multiple methods, well known to those skilled in the art, of achieving this type of synchronization, a detailed discussion of which is beyond the scope of this patent. By way of example, one way to achieve synchronization is by using a genlock (short for generator locking) mechanism. A genlock mechanism, generally speaking, synchronizes multiple devices to a specific timing signal. Another method for achieving synchronization between the multiple video cards is to designate the timing regulating device in one of the video cards as a master timing regulating device and modify the circuit in the other cards so that the timing regulating devices in those cards act as slaves of the master timing regulating devices. The timing regulating devices generally utilize piezoelectric crystals, programmable crystals, oscillators or programmable oscillators as timing reference sources. Using this method, slave cards would be periodically reset by the master crystal so that their timing would be substantially synchronized during the operation of the system.

The multiple video signals 222,224 generated by the various video cards are sent to the VMH 226 which combines them into a single output video signal 228 that is received by the display device 168.

Figure 4:
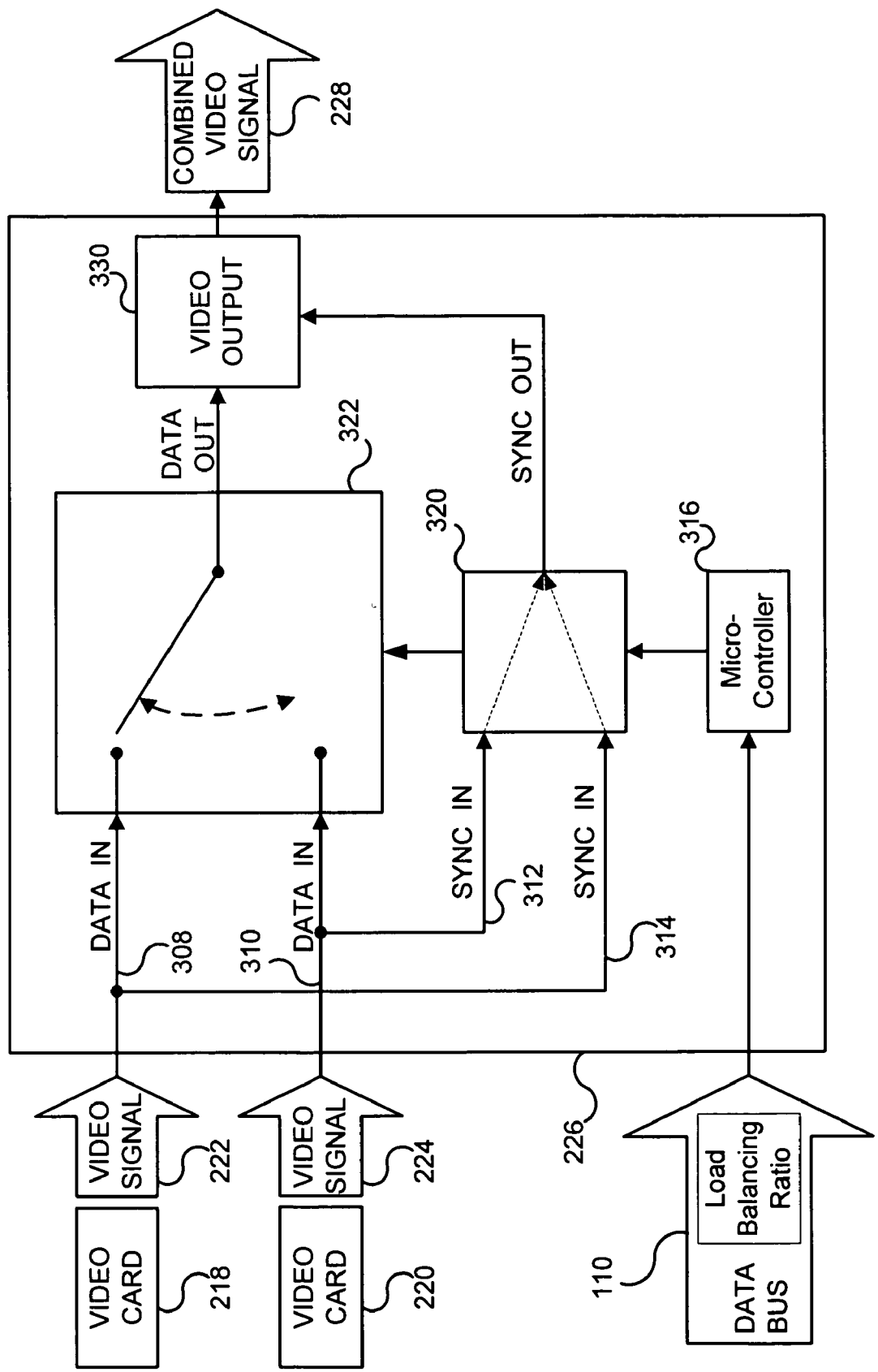
FIG. 4 shows a schematic representation of the operation of the Video Merger Hub of the present invention.

FIG. 4 shows a schematic representation detailing the operation of the VMH 226. The principal components of the VMH are a video switch 322, a video switch controller 320, a microcontroller 316, and a video output 330. Typically, each video signal received by the VMH is composed of a video data component 308,310 and a synchronization component 312,314. The video data component 308,310 is comprised of red, green and blue ("RGB") (or some other representation of pixel colors) values for the pixel that is being drawn at a particular time. The synchronization component 312,314 is comprised of vertical and horizontal synchronization signals ($V_{synch}$ and $H_{synch}$) which determine the vertical and horizontal position (i.e., coordinates) of the pixel that is being drawn at a particular time. Because the outputs from the video cards are synchronized (as described above) the synchronization components 312,314 from the various video signals 222,224 are substantially identical at all times.

As the video signals 222,224 arrive at the VMH, their video data components 308,310 are routed to the video switch 322. The video switch 322 is, in turn, controlled by the video switch controller 320 which receives the synchronization components 312,314. During each screen refresh cycle, the video switch intelligently and sequentially routes the video data component from the various video signals 222,224 in such a manner that a single, seamless combined video signal 228 is then transferred from the video output 330 of the VMH to the display device 168 along with the synchronization components 312,314 which essentially "pass through" the video switch controller.

As stated above, the video switch cycles through its multiple inputs sequentially, producing a single seamless output. The timing of the switching from one video signal to the next is critical and must be done at precisely the correct moment to make the combined video signal 228 appear seamless. In a two video card system such as the one previously used as an example in FIG. 2, at the beginning of the screen refresh cycle, the video data components from the video card 218 assigned to draw the upper half of the screen 256 are routed to the video output 330 of the VMH by the video switch. Then, exactly at the point where the lower half of the screen begins to be drawn by the second video card 220, the video switch 322 is activated, or "triggered", and the video output 330 then begins to receive the video data components from the video card 220 assigned to draw the lower half of the screen 258. As the bottom half of the screen is completed, the screen refresh cycle begins anew, the video switch 322 is again triggered, and the video output 330 again begins to receive video data from the "top portion" video card 218. This cycle is continuously repeated to achieve a seamless combined video signal 228.

The video switch 322 is controlled by the video switch controller 320 which determines how long of an interval there should be between video switch "triggers". The controller 320 determines the triggering interval using three data elements. The first data element is the vertical refresh rate at which the video cards are operating. Vertical refresh rate is expressed in Hertz (Hz) or cycles per second. For example, a video card operating at a vertical refresh rate of 50 Hz redraws the entire screen 50 times every second. Put differently, a video card operating at 50 Hz draws a complete screen in 20 milliseconds. The video switch controller dynamically calculates the vertical refresh rate from the $V_{synch}$ part of the synchronization component 312,314 it receives from the multiple video card signals 222,224.

The second data element is the vertical resolution. One way to determine the vertical resolution is to count the number of horizontal sync pulses per frame (frame duration is calculated based on the refresh rate). For example, a video card operating at a vertical resolution of 1600×1200 has a vertical resolution of 1200 scanlines. This means that in every frame there are 1200 scanlines of video data.

The third data element used by the video switch controller 320 is the percentage of the screen which is assigned to each video card 218,220. In certain situations it may be desirable to equally divide the screen between the video cards. In other situations, such as when one video card is more powerful than the other(s), it may be desirable to assign a greater proportion of the screen to one or more of the video cards. This element, termed the "load balancing ratio", is assigned through software and, optionally, through user input, and is obtained by the microcontroller 316 from the computer's data bus 110. The load balancing ratio is, in turn, obtained by the video switch controller 320 from the VMH microcontroller 316.

Once the vertical refresh rate, vertical resolution and the load balancing ratio are known to the video switch controller 320, it can easily calculate the triggering intervals to be used to generate the combined video signal 228. By way of illustration, in a two video card system operating at 50 Hz (i.e., 20 milliseconds to draw an entire screen) with a vertical resolution of 1200 and in which the video cards assigned to draw the upper and lower halves of the screen were respectively allocated a 25% and 75% load balancing ratio, the switching sequence would be as follows: (1) at the beginning of the screen refresh cycle, the video switch 322 would direct the video data components 308 from the upper portion video card 218 to the video output 330 of the VMH; (2) after 300 scanlines (25% of 1200 scanlines) the switch would be triggered by the controller 320 and would begin directing video data components 310 from the lower portion video card 220 to the video output 330 of the VMH; (3) after an additional 900 scanlines (75% of 1200 scanlines) the video switch 322 would be triggered to its original position to begin a new screen refresh cycle. To avoid introducing any artifacts into the end image, all switches between the various video cards are timed to occur during the horizontal blanking period of the video signals.

Those skilled in the art will recognize that using a simple test feedback loop program which dynamically adjusts the load balancing ratio based on the load of each of the video cards, on a dynamic or frame by fame basis, can maximize the throughput of the combined GPUs.

Accordingly, it will be understood that the preferred embodiment of the present invention has been disclosed by way of example and that other modifications and alterations may occur to those skilled in the art without departing from the scope and spirit of the appended claims.

The invention claimed is:

1. A video merger hub for combining the outputl signals from a plurality of video cards into a single graphics output signal and displaying said single graphics output signal on a visual output device comprised of: a video switch; a video switch controller; a microcontroller; and a video output,
   wherein said video switch receives said output signals from said plurality of video cards and sequentially routes selected portions of said output signals from said plurality of video cards to said video output,
   wherein said video switch is controlled by said video switch controller,
   wherein said video switch controller controls said video switch by triggering routing switches at appropriate intervals, and
   wherein said routing switch triggering intervals are determined on the basis of: the vertical refresh rate of said output signals from said plurality of video cards; the vertical resolution of said output signals from said plurality of video cards; and the load balancing ratio assigned to each of said plurality of video cards.

2. The video merger hub of claim 1 wherein said load balancing ratio is transmitted by said microcontroller to said video switch controller.

3. The video merger hub of claim 1 wherein said load balancing ratio is assigned by a user through software.

4. The video merger hub of claim 1 wherein said load balancing ratio is equal for each of said video cards.

5. The video merger hub of claim 1 wherein said load balancing ratio is calculated by determining an optimized load balancing ration for each of said video cards based on its graphics throughput.

6. The video merger hub of claim 1 wherein said load balancing ratio is dynamically adjusted to maximize the throughput of a subsystem by utilizing a test feedback loop program which measures the load on each of said video cards and makes appropriate adjustments.

* * * * *